(12) United States Patent
Tsai et al.

(10) Patent No.: US 8,609,000 B2
(45) Date of Patent: Dec. 17, 2013

(54) METHOD FOR MANUFACTURING A HOUSING OF A NUMERIC DISPLAY

(75) Inventors: Cheng-Han Tsai, Taoyuan (TW); Chao-Ming Wu, Yilan (TW); Shih-Yuan Kuo, New Taipei (TW); Chih-Wei Wang, New Taipei (TW); Hui-Ling Lin, Gukeng Township, Yunlin County (TW)

(73) Assignees: Lite-On Electronics (Guangzhou) Limited, Guangzhou (CN); Lite-On Technology Corporation, Taipei (TW)

( * ) Notice: Subject to any disclaimer, the term of this patent is extended or adjusted under 35 U.S.C. 154(b) by 130 days.

(21) Appl. No.: 13/042,750

(22) Filed: Mar. 8, 2011

(65) Prior Publication Data

US 2011/0272833 A1 Nov. 10, 2011

(30) Foreign Application Priority Data

May 5, 2010 (CN) .......................... 2010 1 0163021

(51) Int. Cl.
*B29C 45/14* (2006.01)
*B29C 45/16* (2006.01)

(52) U.S. Cl.
USPC ........... 264/250; 264/247; 264/275; 264/267; 264/1.7; 264/1.9

(58) Field of Classification Search
None
See application file for complete search history.

(56) References Cited

U.S. PATENT DOCUMENTS

| | | | | |
|---|---|---|---|---|
| 2,565,803 A | * | 8/1951 | Danielson et al. | 264/135 |
| 2,663,910 A | * | 12/1953 | Danielson et al. | 264/247 |
| 3,354,249 A | * | 11/1967 | Morin | 264/161 |
| 4,444,329 A | * | 4/1984 | Vollers | 215/230 |
| 5,951,349 A | * | 9/1999 | Larose et al. | 445/22 |
| 5,993,019 A | * | 11/1999 | Kline et al. | 362/29 |
| 6,928,297 B2 | * | 8/2005 | Kitamura et al. | 455/550.1 |

FOREIGN PATENT DOCUMENTS

JP 2006267245 * 10/2006

* cited by examiner

*Primary Examiner* — Edmund H. Lee
(74) *Attorney, Agent, or Firm* — Li & Cai Intellectual Property (USA) Office

(57) ABSTRACT

The method for manufacturing a housing of a numeric display have the steps of: providing a first injection-molding step for forming a reflecting cover, wherein the reflecting cover has a plurality of pattern segment units, each pattern segment unit is defined by reflecting surfaces of the reflecting cover and has a through hole, and providing a second injection-molding step for forming a transparent injection-molded body into each pattern segment unit, surfaces of the formed transparent injection-molded body being bonded to the corresponding reflecting surfaces, and the reflecting cover and the transparent injection-molded body being constructed as the housing of the numeric display.

15 Claims, 8 Drawing Sheets

METHOD FOR MANUFACTURING A HOUSING OF A NUMERIC DISPLAY

BACKGROUND OF THE INVENTION

1. Field of the Invention

The present invention relates to a method for manufacturing a numeric display; and particularly, to a manufacturing method for a housing of a numeric display.

2. Description of Related Art

A numeric display is a display module for displaying graphics and symbols using LEDs or electro-optical substances. The numeric display has been widely used in the indicators or display elements of many modern electronic products, such as family electric appliances, acoustic electric devices, and cameras.

In a traditional manufacturing process, a reflecting cover of the numeric display is first formed and a housing of the numeric display is then formed by dispensing epoxy into the reflecting cover. Next, the housing of the numeric display with epoxy is baked to cure. Then, a printed circuit board having LED chips is connected and reflowed on the housing.

However, the traditional method has the following disadvantages.

1. Long processing time: The traditional dispensing process has a baking step to cure the epoxy. For example, the epoxy is heated at 110° C. in time period of 1.5 hours (i.e., pre-curing) and then is cured at 120° C. in time period of 3 hours (i.e., post-curing). Therefore, the traditional manufacturing time of the numeric display is long and the cost cannot be reduced.

2. More defects in the product: There are problems of leakage of epoxy or un-uniform dispensing of epoxy in the traditional method, and the problems result in recesses on the lighting surface of the numeric display after the baking process. Consequently, the defects of bubbles, light spots or un-uniform light occurred in the numeric display.

3. Variant in the product structure: As discussed in points 1 and 2, a thermal stress is generated in the epoxy during the baking step so that the house would be deformed. Therefore, the product has deformations thereon and the manufacturing yield is low.

Consequently, with regard to the resolution of defects illustrated hereinbefore, the inventors of the present invention propose a reasonably and effectively designed solution for effectively eliminating such defects.

SUMMARY OF THE INVENTION

The objective of the present invention is to provide a method for manufacturing a housing of a numeric display, which is characterized in that a transparent material is injected and molded on a reflecting cover to form the housing of the numeric display. The injection-molding step replaces the traditional dispensing process so that the baking time is eliminated and the manufacturing time of the housing of the numeric display is reduced.

To achieve the objective described as above, the present invention discloses a method for manufacturing a housing of a numeric display, including the steps of:

Step 1: providing a first injection-molding step for forming a reflecting cover, wherein the reflecting cover has a plurality of pattern segment units, each pattern segment unit is defined by a plurality of reflecting surfaces of the reflecting cover and has a through hole; and Step 2: providing a second injection-molding step for filling a transparent material into each pattern segment unit to form a transparent injection-molded body.

The transparent material may be a thermoplastic material or a thermosetting material. In an embodiment, the thermoplastic transparent material has a main component of PPA or PA. The transparent material of PPA may be applied in a SMT product which is formed though a thermal re-flow process of above 220° C. The transparent material of PA may be applied in a DIP product which is formed without a thermal re-flow process. In another embodiment, the thermosetting transparent material can be silicone or resin material.

The surface of the transparent injection-molded body formed in the second injection-molding step could have microstructures (i.e., lens structure, trench structure, notch structure, or equivalent concave lens) or lens to improve the light performance of the numeric display.

In order to further appreciate the characteristics and technical contents of the present invention, references are hereunder made to the detailed descriptions and appended drawings in connection with the present invention. However, the appended drawings are merely shown for exemplary purposes, rather than being used to restrict the scope of the present invention.

DETAILED DESCRIPTION OF THE PREFERRED EMBODIMENTS

The present invention relates to a method for manufacturing a housing of a numeric display. The method of the present disclosure employs two injection-molding steps to solve the problems of light spots, bubbles, non-uniform lighting distribution, or epoxy leakage/non-uniformity caused by the traditional dispensing and thermal curing techniques. On the other hand, the deformation of the traditional dispensing process resulted from the thermal stress under the high temperature curing can be avoided. Further, since the traditional dispensing process is not applied, the mentioned defects do not occur in the housing manufactured by the present method. Accordingly, the issues of bubbles, light spots and non-uniformity of light resulted from the recess of the lighting surface after curing the epoxy are eliminated by the present invention.

Figure 1A:
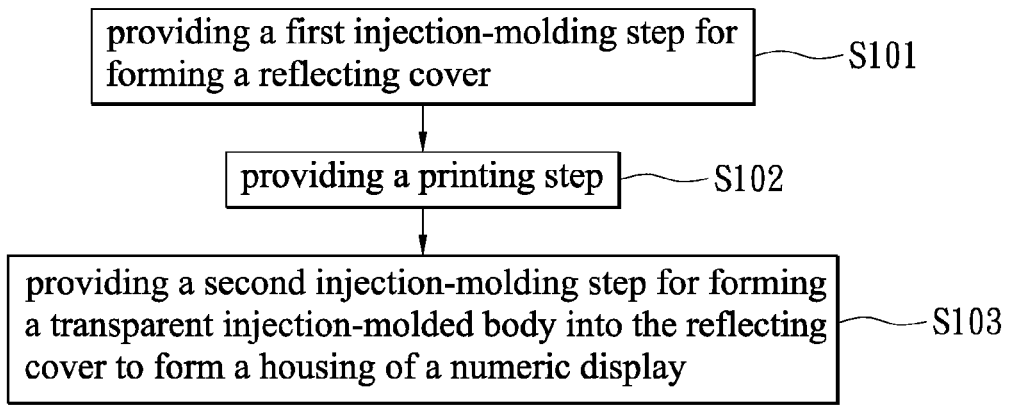
FIG. 1A is a flow chart of a method for manufacturing a housing of a numeric display according to a first embodiment of the present invention.
Figure 2A:
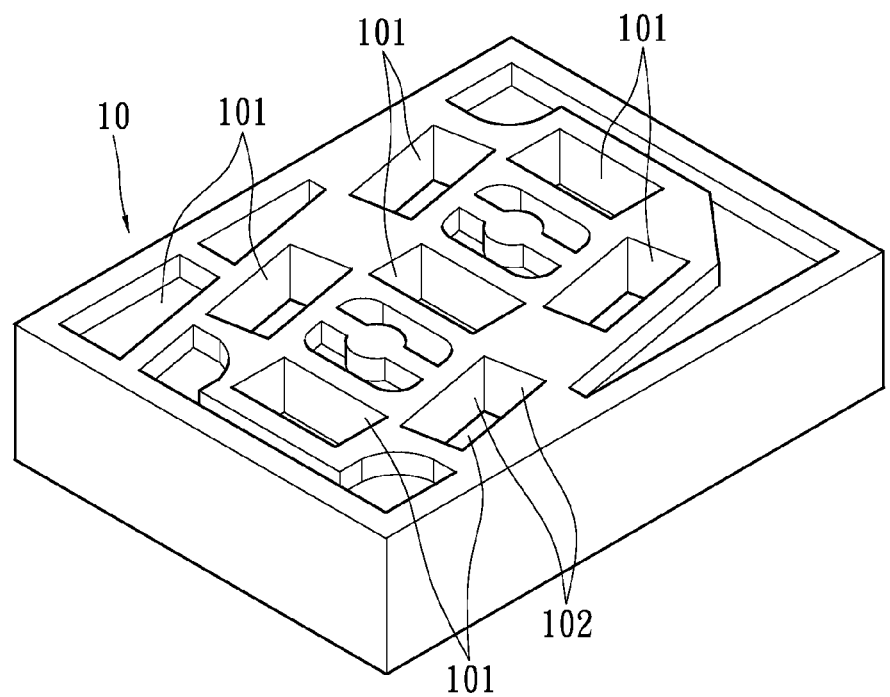
FIG. 2A is a rear view of the reflecting cover of the numeric display according to the present invention.

Please refer to FIG. 1A. The method of the present invention comprises the following steps. The step S101 is a step of providing a first injection-molding step for forming a reflecting cover 10. Please refer to FIGS. 2A and 2B. The reflecting cover 10, which is a main structure of the housing of the numeric display, is formed by the first injection-molding method. A transparent injection-molded body 11 is subsequently formed on the reflecting cover 10 to construct as the housing of the numeric display. It is worth noting that the term "transparent" in the transparent injection-molded body generally refers to the physical property of allowing light with a specific wavelength, such as a wavelength range of the visible light, to pass through a material.

Figure 2B:
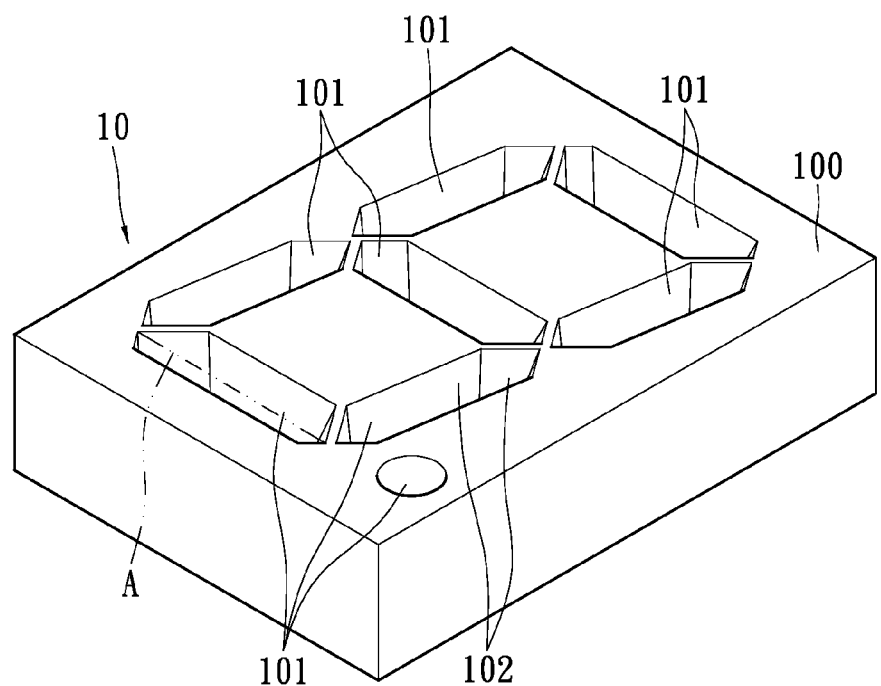
FIG. 2B is a front view of the reflecting cover of the numeric display according to the present invention.
Figure 3:
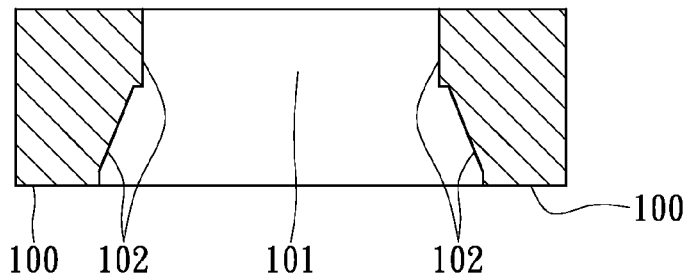
FIG. 3 is a cross-sectional diagram of one pattern segment unit of the reflecting cover of the numeric display according to the present invention.

The reflecting cover 10 has a plurality of pattern segment units 101 thereon. FIG. 3 shows a cross-section of one pattern segment unit 101 of FIG. 2A. The pattern segment unit 101 is defined by the reflecting surfaces 102 of the reflecting cover 10. The pattern segment unit 101 has a through hole having a top opening and a bottom opening Referring to FIGS. 2A and 2B, the present embodiment provides an example where the reflecting cover 10 is designed to display the number of "8" and a decimal point (DP) "." at the right corner. The reflecting cover 10 is formed by using a horizontal injection molding apparatus and a mold in the first injection-molding step. Specifically in FIG. 2B, the reflecting cover 10 has eight pattern segment units 101. A transparent material is filled into each of the pattern segment units 101 in a following second injection-molding step. Thus, there are seven pattern segment units to represent the number "8" and one pattern segment unit that represents the decimal point ".".

Figure 4A:
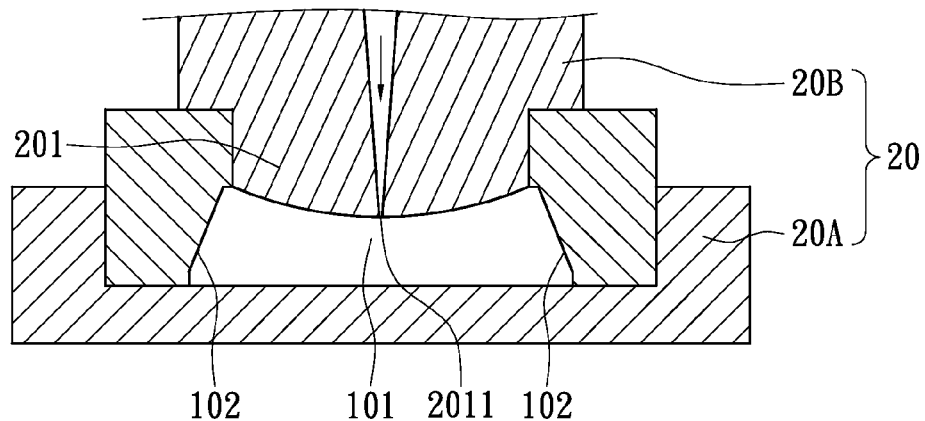
FIGS. 4A and 4B show the second injection-molding step according to one embodiment of the present invention.
Figure 4B:
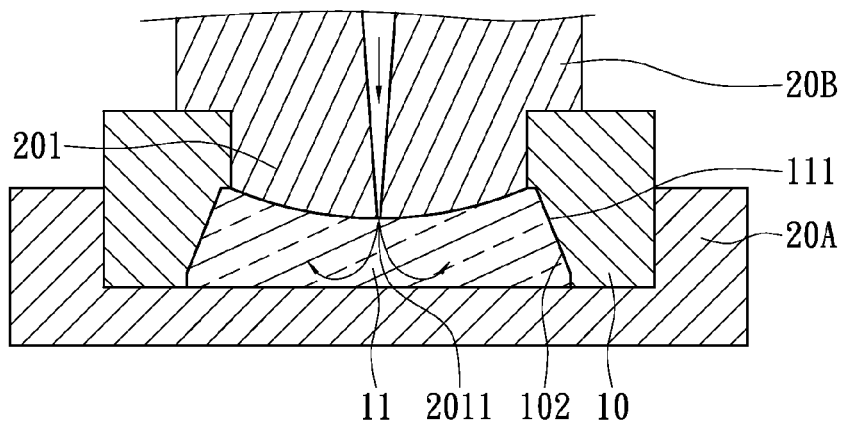

The step S103 is a step of providing a second injection-molding step and the step 103 is used for filling a transparent material into each pattern segment unit 101 to form a transparent injection-molded body 11 into the pattern segment unit 101. FIGS. 4A and 4B show that the second injection-molding step is performed in the cross-section of the pattern segment unit 101 shown in FIG. 3. The transparent material is injected into the pattern segment unit 101 of the reflecting cover 10 and hardened to form the transparent injection-molded body 11. The surfaces 111 of the transparent injection-molded body 11 are bonded to the corresponding reflecting surfaces 102, respectively. The reflecting cover 10 and the transparent injection-molded body 11 are bonded to each other to make up the housing of the numeric display. Then, the housing can be assembled to a printed circuit board with LED chips to form the numeric display.

Figure 1B:
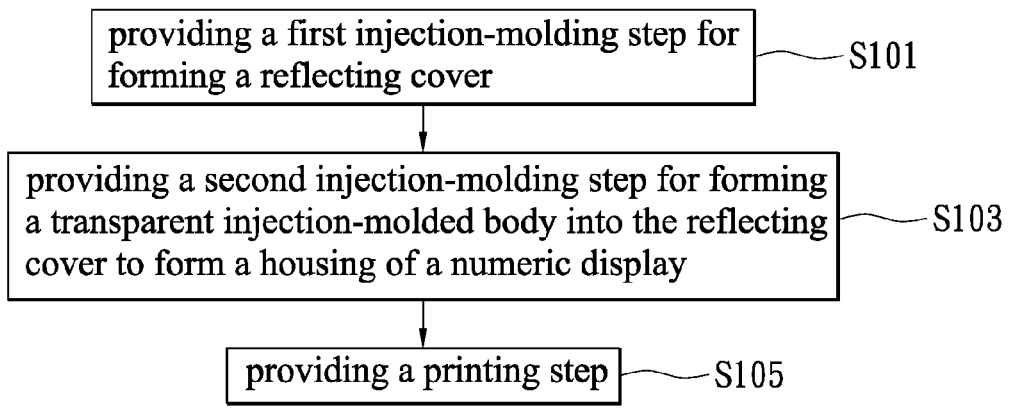
FIG. 1B is a flow chart of the method for manufacturing the housing of the numeric display according to a second embodiment of the present invention.

The present manufacturing method can further have a printing step shown as the step S102 in FIG. 1A or as the step S105 in FIG. 1B. Referring back to FIG. 1A, the printing step of the step S102 can be carried out between the first injection-molding step of the step S101 and the second injection-molding step of the step S103 to apply a predetermined color and/or a predetermined graphic pattern on the reflecting cover 10. For example, a printing apparatus can be used to provide colors or patterns on the top surface 100 of the reflecting cover 10, as shown in FIG. 2B. Alternatively, the printing step of the step S105 in FIG. 1B is performed after the second injection-molding step of the step S103. The printing step can be implemented in various ways. As discussed above, color inks can be disposed to provide color on the reflecting cover 10. Another method is to attach a color film on the reflecting cover 10 and then remove the color film on the partial area of the transparent injection-molded body 11 by laser. Still another method is to print the entire area of the top surface 100 of the reflecting cover 10 and then remove the color film on the partial area of the transparent injection-molded body 11 by laser. Accordingly, the top surface 100 of the reflecting cover 10 may have color or/and patterns thereon.

In this embodiment, a mold 20 is used for performing the second injection-molding step. The mold 20 includes a lower mold 20A and an upper mold 20B, as shown in FIGS. 4A and 4B. To carry out the second injection step, the upper and the lower molds 20A, 20B are secured around and clamp the reflecting cover 10. The upper mold 20B can have at least one protrusion member 201 to respectively match each of the pattern segment units 101 on the reflective cover 10. In this embodiment, a single reflecting cover 10 is mounted on the lower mold 20A, and the lower mold 20A contacts the printed surface (i.e., the top surface 100) of the reflecting cover 10. Preferably, the reflecting cover 10 is received in the lower mold 20A, and the size of the protrusion member 201 corresponds to that of the pattern segment unit 101 so that the protrusion member 201 of the upper mold 20B can be extend into the pattern segment unit 101. Moreover, the upper mold 20B has a gate 2011 on the protrusion member 201 so that the transparent material can be filled into a space of the pattern segment unit 101 (i.e., the area defined by the lower mold 20A, the protrusion member 201, and the reflecting surfaces 102, as shown in FIGS. 4A and 4B) to form the transparent injection-molded body 11 by an insert-molding apparatus. In other words, the second injection step have a step of filling the transparent material into the space defined by the lower mold 20A, the protrusion member 201, and the reflecting surfaces 102 through the gate 2011 to form the transparent injection-molded body 11. The surfaces 111 of the formed transparent injection-molded body 11 are bonded to the corresponding reflecting surfaces 102 so that the reflecting cover 10 and the transparent injection-molded body 11 are constructed as the housing of the numeric display. Because the transparent injection-molded body 11 is formed by injection-molding which is not the baking step, the problems of bending and other structural defects from thermal stress caused by the traditional baking process can be solved.

The lower mold 20A may be fixed and the upper mold 20B may be movable and adjustable during the second injection-molding step. In this embodiment, the upper mold 20B has a single protrusion member 201 having one gate 2011 for filling the transparent material into one pattern segment unit 101. Thus, the number of the upper mold protrusion member 201 generally matches the number of the pattern segment unit 101, and the shape of the protrusion member 201 generally corresponds to the pattern segment unit 101 of the reflecting cover 10. That means the mold 20 for one reflecting cover 10 used in the second injection-molding step may have one lower mold 20A and some upper molds 20B. Alternatively, the mold 20 for one reflecting cover 10 used in the second injection-molding step may have one lower mold 20A and only one upper mold 20B, and the one upper mold 20B has corresponding number of the protrusion member(s) 201 and the gate(s) 2011 to the pattern segment unit(s) 101. Still alternatively, one lower mold 20A may be used for carrying some reflecting covers 10 (i.e., six or eight reflecting covers 10). The one upper mold 20B may have number of the protrusion member 201 and the gate 2011 corresponding to the pattern segment units 101 (for example, six reflecting covers 10 have forty-eight pattern segment units 101). Therefore, the mold 20 having one lower mold 20A and one upper mold 20B may be used for manufacturing some reflecting covers 10. Still alternatively, one upper mold 20B may have some protrusion members 201 and only one gate 2011, or less number of gate 2011 than the protrusion members 201 so that the transparent material is filled into pattern segment units 101 simultaneously through the gate 2011. To summarized, the mold 20 of the present invention may have various types and is not restricted thereby.

Another upper mold 20B is disclosed as follows. It should be noted that the structural arrangement of the protrusion member 201 is not restricted to be extending into the pattern segment units 101. For example, in another embodiment, the upper mold 20B has no protrusion member 201, and the gate 2011 is designed on the upper mold 20B, which corresponds to the opening of the pattern segment units 101 so as to fill the transparent material thereinto. Further, the position of the gate 2011 designed on the protrusion member 201 may be adjusted. The position of the gate 2011 may be located on the center of the protrusion member 201, or be located on a side of the center of the protrusion member 201 as discussed hereinafter. The structure of the transparent injection-molded body 11 has various types. In one embodiment, due to the protrusion member 201 extending into the pattern segment unit 101, the total remaining space of the pattern segment unit 101 is filled with the transparent material and the transparent material is hardened to form transparent injection-molded body 11. Alternatively, the partial remaining space of the pattern segment unit 101 is filled with the transparent material. In another embodiment, the protrusion member 201 does not extend into the pattern segment unit 101, and the entire pattern segment unit 101 is filled with the transparent material, or partial of the pattern segment unit 101 is filled with the transparent material. In other words, the methods and molds used in the present invention are not restricted thereby, and the forms of the formed transparent injection-molded body 11 of the transparent material inside the pattern segment unit 101 are not restricted thereby.

In an embodiment, the transparent material can be a thermoplastic material, and the main component thereof may be PPA (polyphthalamide). The transparent injection-molded body 11 formed by the mentioned transparent material, i.e. with the main component of PPA, is used in a high temperature thermal reflow process with an operation temperature above 220° C., preferably, the operation temperature of the thermal reflow process is ranged from 240° C. to 260° C. and the processing time is ranged from 4 to 5 minutes. In practice, the transparent material with PPA (i.e., the formed transparent injection-molded body 11 with PPA) can pass through the IR reflow oven at 260° C., and in time period of 4.5 minutes. In the exemplary embodiment, the transparent material with PPA can be Grivory ST7514 available from EMS-Grivory. Therefore, the transparent material having a PPA material may be used to manufacturing the housing of the numeric display of the present invention, which can pass the high temperature thermal reflow process to be applied to an SMT type numeric display.

The main component of the transparent material in another embodiment is PA (polyamide) and the formed transparent injection-molded body 11 of PA has a glass transition temperature (Tg) of 200° C. In the exemplary embodiment, the material with PA can be Grivory ST3012 available from EMS-Grivory. The transparent injection-molded body 11 of PA may be used in the present invention to manufacture the housing of the numeric display which is not necessary to pass through the thermal reflow process, for example, a DIP type numeric display. To summarized, the main component of the thermoplastic transparent material at least have PA or PPA materials to manufacture various types of the numeric display.

The transparent material may be a thermosetting material which at least has a component of silicone or resin materials. The process of using the thermosetting transparent material may be similar with the proceeding process of the thermoplastic transparent material but not restricted thereby. Alternatively, the transparent material may be a composite resin which has thermosetting property or thermoplastic property in different temperature.

On the other hand, both of the two kinds of the above-mentioned transparent materials may have at least one additive, such as a diffusing agent of calcium carbonate which is commercially available of DSN-30 or fluorescent powders, for improving the light-emitting property of the numeric display.

The first injection-molding step of the step S101 and the second injection-molding step of the step S103 have the following practice types, as shown in FIGS. 5, 6A, 6B, 7, 8A and 8B.

Figure 5:
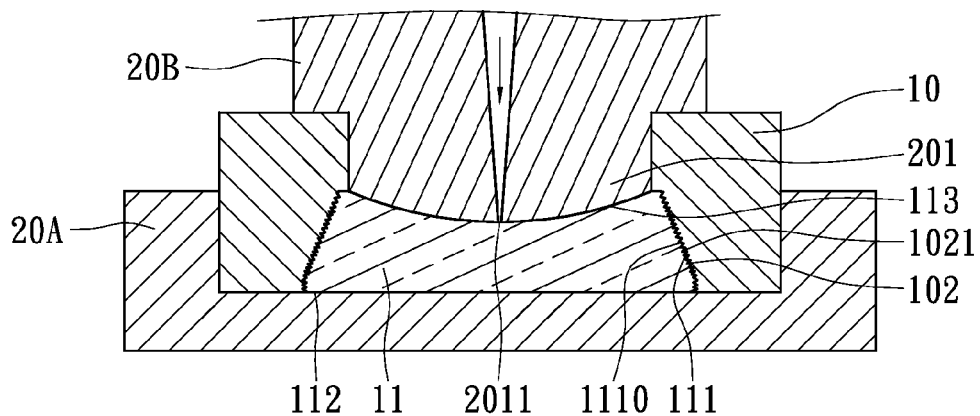
FIG. 5 illustrates another embodiment of the second injection-molding step according to the present invention.

Please refer to FIG. 5; the mold of the step S101 can be formed by shaping, laser beam machining, electro-discharge machining or the other machining methods to form at least a first rough structure 1021 on at least one reflecting surface 102 of the pattern segment unit 101 of the reflecting cover 10. For example, the reflecting surfaces 102 which laterally surround the space have the first rough structure 1021, respectively. Therefore, in the second injection-molding step, the outer surfaces 111 of the formed transparent injection-molded bodies 11 in the space of the pattern segment unit 101 has a second rough structure 1110 corresponding to the first rough structure 1021. The first rough structure 1021 and the second rough structure 1110 may be bonded to each other so as to improve the binding strength of the reflecting cover 10 and formed transparent injection-molded bodies 11. Please note that the first rough structures 1021 are formed on the two of reflecting surfaces 102 shown in the cross-sectional view of FIG. 5, but the first rough structures 1021 may be formed on all of the reflecting surfaces 102 (i.e., one pattern segment unit 101 of number "8" has six reflecting surfaces 102 in FIG. 2B), or the first rough structures 1021 may be formed on only one of the reflecting surfaces 102.

For improving the light emitting property of the LED assembled with the numeric display, there are optical structures formed on the lighting surface 112 and the inner surface 113 of the formed transparent injection-molded body 11. The optical structures are formed by the following methods.

Figure 8A:
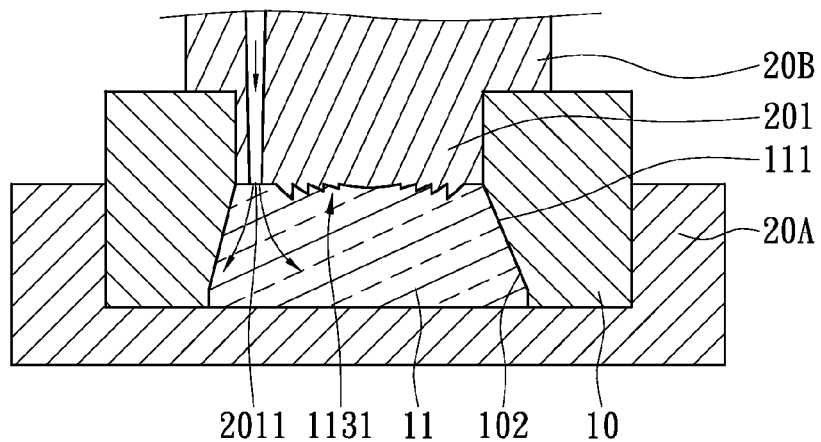
FIG. 8A illustrates still another embodiment of the second injection-molding step according to the present invention.
Figure 8B:
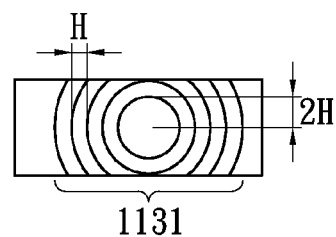
FIG. 8B shows a top view of the pattern structure on the inner surface of the transparent injection-molded body in FIG. 8A.
Figure 9A:
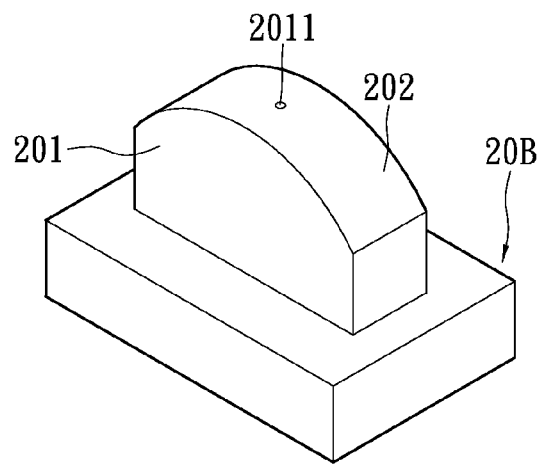
FIGS. 9A to 9E are schematic diagrams showing various types of the upper mold according to the present invention.
Figure 9B:
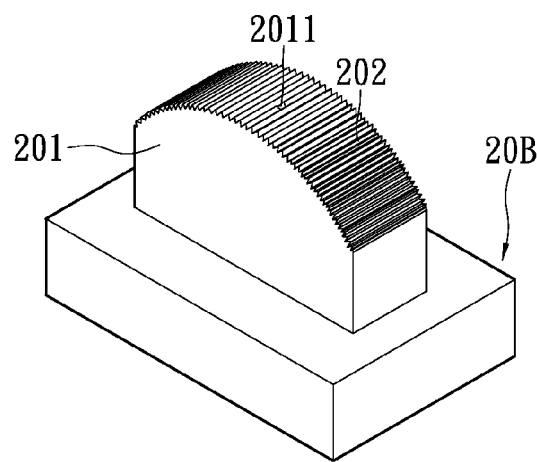
Figure 9C:
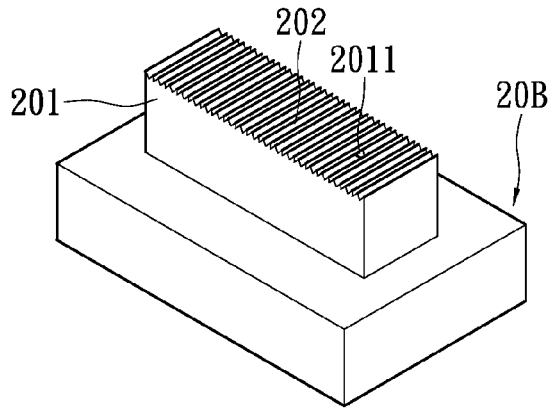
Figure 9D:
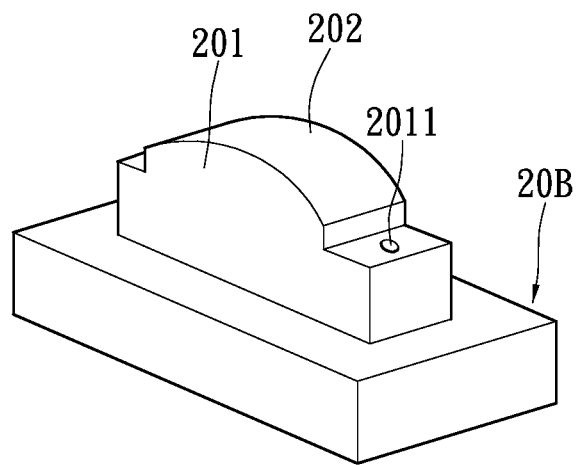
Figure 9E:
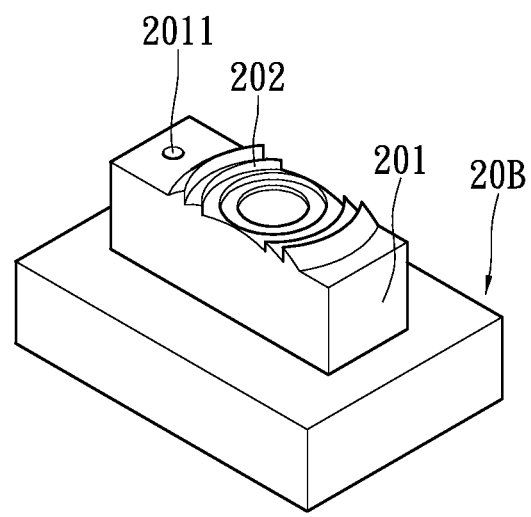

In the second injection-molding step of the step S103, the protrusion member 201 of the upper mold 20B has a predetermined structure 202, such as an arc structure (as shown in FIG. 9A), a groove structure (as shown in FIG. 9B), a V-cutting structure (as shown in FIG. 9C), or a salient structure (as shown in FIG. 9E). After the second injection-molding step of forming transparent injection-molded body 11, the pattern structure 1131 is formed on the inner surface 113 of the formed transparent injection-molded body 11, and the pattern structure 1131 is a lens structure corresponding to the arc structure (as shown in FIG. 4B), or the pattern structure 1131 is a trench structure corresponding to the groove structure (as shown in FIGS. 6A and 6B), or the pattern structure 1131 is a notch structure corresponding to the V-cutting structure, or the pattern structure 1131 is an equivalent concave lens corresponding to the salient structure (as shown in FIGS. 8A and 8B).

Figure 6A:
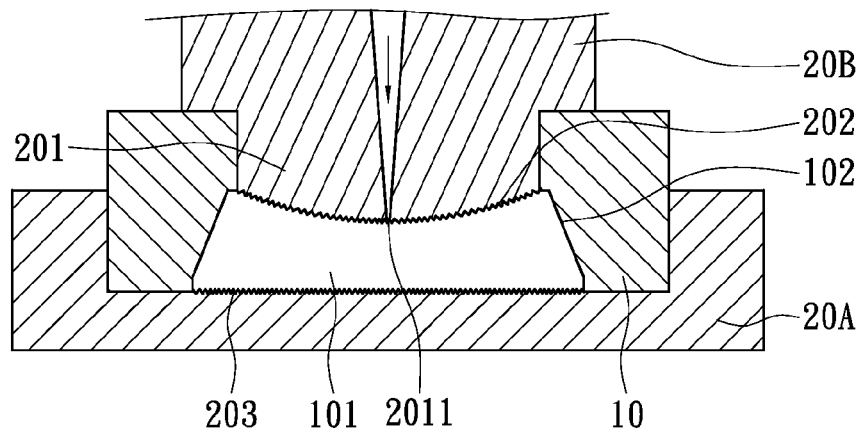
FIG. 6A illustrates still another embodiment of the second injection-molding step according to the present invention.
Figure 6B:
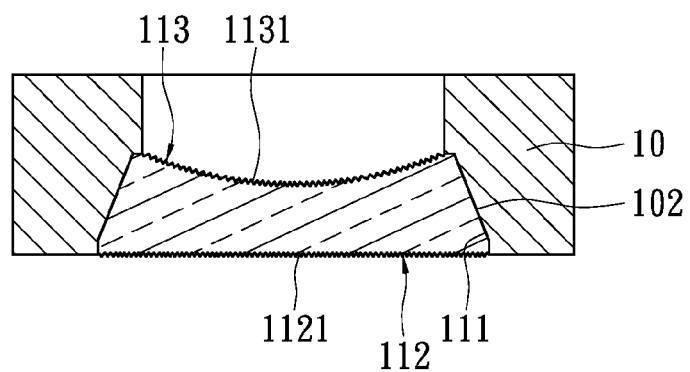
FIG. 6B illustrates the structure after removing mold of FIG. 6A.
Figure 7:
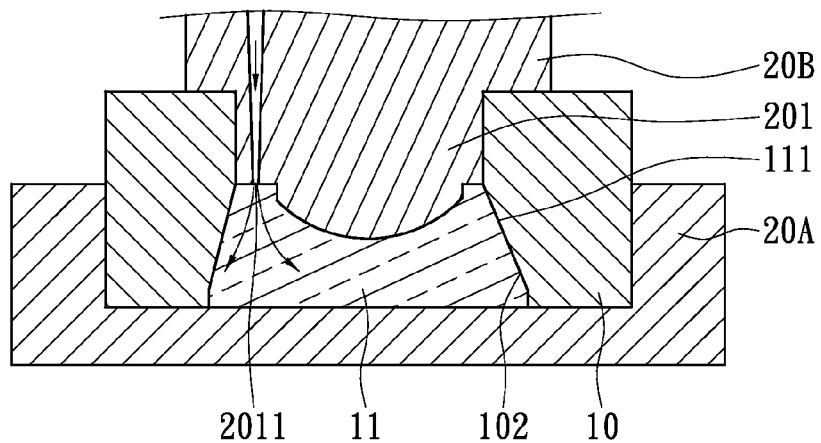
FIG. 7 illustrates further another embodiment of the second injection-molding step according to the present invention.

Please refer to FIGS. 6A and 6B; the lower mold 20A further has microstructures 203 by an electro-discharge machining method so that a lighting surface 112 of the formed transparent injection-molded body 11 has optical micro-structures 1121 which are transferred from the microstructures 203 after the second injection-molding step. The optical micro-structures 1121 are used to diffusing lights emitted form a point light source, such as the LED, to change into a planar lighting source. In the embodiment, the lighting surface 112 includes a center line roughness average (Ra) ranged from 1.6 mm to 3.2 mm for diffusing the light.

Moreover, the upper mold 20B may have different structures. Please refer FIGS. 7 and 9D; the position of the gate 2011 may be located on a side of the protrusion member 201 rather than on the center of the protrusion member 201 so that the formed transparent injection-molded body 11 has smooth inner surface 113 to improve light-emitting property. In order to acquire more uniform lights through the transparent injection-molded body 11, the gate 2011 is located on a side of the protrusion member 201 and the protrusion member 201 further has a salient predetermined structure 202 as a lens structure, and the lens structure can be transferred to an equivalent concave lens like a Fresnel lens. The salient predetermined structure 202 has a plurality of concentric annular grooves and each concentric annular groove has a cross-section similar to a part of a convex lens. Different from the traditional Fresnel lens is that the concentric annular grooves are spaced equidistantly. Furthermore, the radius in the innermost concentric annular groove is as twice as the pitch defined by two adjacent concentric annular grooves and the concentric annular grooves have different height (i.e., the outermost concentric annular groove is the highest, and the heights of the concentric annular grooves are decreased from the outermost one to the innermost one). After the injection-molding step, the pattern structure 1131 with an equivalent concave lens being a similar Fresnel lens and corresponding to the salient predetermined structure 202 is formed, as shown in FIG. 8B. The pattern structure 1131 has concentric annular rings with an equidistant spacing of "H", and the radius of the innermost concentric annular ring is "2 H". As shown in FIG. 8A; there is the deepest groove similar to the part of the concave lens in the cross-section of the outermost concentric annular ring of the pattern structure 1131. The depths of the concentric annular rings are decreased from the outermost one to the innermost one, and the respective tops in the concentric annular rings of the pattern structure 1131 are aligned in a substantial horizontal level. Through this approach, a larger view angle for a concave spherical lens and a light-mixing distance with a substantial constant thickness can be obtained, thereby emitting uniform lights. Alternatively, the pattern structure 1131 may be a Fresnel lens (not shown), and the respective concentric annular rings have equal depths but different spacing are formed therebetween. The respective tops of the concentric annular rings of the pattern structure 1131 are aligned in a substantial horizontal level so as to provide a divergent light equivalent to a plane-concave lens. The predetermined structure 202 is a salient structure corresponding to the Fresnel lens.

Figure 10A:
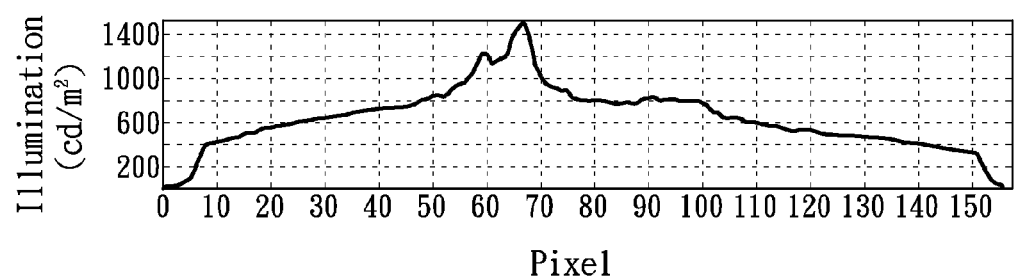
FIG. 10A shows the brightness distribution of a numeric display having the housing according to the present invention, wherein the lighting surface is a smooth surface.
Figure 10B:
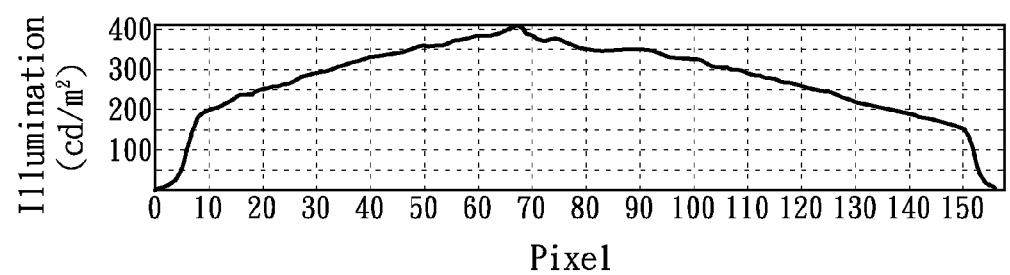
FIG. 10B shows the brightness distribution of a numeric display having the housing according to the present invention, wherein the lighting surface is a rough surface.

In addition, different brightness distribution graphs of the numeric display of the present invention are shown in FIGS. 10A and 10B, respectively. LEDs are assembled on the housing of the numeric display formed by the present invention. The brightness distribution of the segment "A" defined on the bottom pattern segment unit 101 of number "8" shown in FIG. 2B is measured and the lighting surface 112 is a smooth surface. As shown in FIG. 10A; the peak width ratio at the half-height is about 27.6%. The peak width at the half-height is about 40 pixels and the width of the segment "A" is about 145 pixels. On the other hand, the brightness distribution of the segment "A" defined on the bottom pattern segment unit 101 of number "8" with Ra of 1.6 mm is measured. As shown in FIG. 10B; the peak width ratio at half-height is about 86.2%. The peak width at the half-height is about 124 pixels and the width of the segment "A" is about 145 pixels. Therefore, the roughness of the lighting surface 112 may be modified for diffusing light to avoid highlight spots.

Accordingly, the second injection-molding step of the step S103 is provided for injecting transparent material and bonding the formed transparent injection-molded body 11 with the reflecting cover 10 to from the housing of the numeric display. The mold 20 used in the second injection-molding step may have optical structures or micro-structures (i.e., the predetermined structures 202 and microstructures 203) so that the formed transparent injection-molded body 11 has the pattern structures 1131 and the optical micro-structures 1121 corresponding to the predetermined structures 202 and microstructures 203. After step of S103, a PCB mounted with LEDs can be assembled onto the manufactured housing by a thermal welding method. The light generated from the LEDs can be condensed by the reflecting surfaces 102 of the reflecting cover 10, and then pass through the inner surface 113 and the exposed lighting surface 112 of the transparent injection-molded body 11. Moreover, the pattern structures 1131 on the inner surface 113 and the optical micro-structures 1121 on the lighting surface 112 may improve the diffusion property.

In summary, the present invention has the at least one of following advantages.

1. The second injection-molding step is provided for forming transparent injection-molded body onto the reflecting cover so that time for curing epoxy in the traditional dispensing method is eliminated. According to the experimental data, the manufacturing time of the present invention is less than that of the traditional method about 4.5 hours.

2. The second injection-molding step replaces the traditional dispensing method. Therefore, it is not necessary to cure the transparent material by a reflow oven. That means the thermal stress induced by the high temperature during the baking process can be avoided and the deformation issue of the reflecting cover resulted from the thermal stress can be eliminated.

3. Without any traditional dispensing process, the issues of leaking of epoxy and difficulty of controlling the amount of epoxy do not occur in the present invention. Furthermore, the problems of bubbles, highlight spots or non-uniformity of the light resulted from the recess of the lighting surface after the high temperature baking process are simultaneously solved.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A method for manufacturing a housing of a numeric display, comprising the steps of:
providing a first injection-molding step for forming a reflecting cover, wherein the reflecting cover has a plurality of pattern segment units, and each pattern segment unit is defined by a plurality of reflecting surfaces of the reflecting cover and has a through hole; and providing a second injection-molding step for filling a transparent material into each pattern segment unit to form a transparent injection-molded body, wherein surfaces of the formed transparent injection-molded body being bonded to the corresponding reflecting surfaces, thereby the reflecting cover and the transparent injection-molded body being constructed as the housing of the numeric display, wherein an upper mold and a lower mold are used to clamp the reflecting cover, the upper mold has a protrusion member and a gate, the protrusion member extends into one of the pattern segment units, the protrusion member further has a predetermined structure, and the transparent material is filled into a space defined by the lower mold, the protrusion member, and the reflecting surfaces through the gate to form the transparent injection-molded body, wherein an inner surface of the formed transparent injection-molded body has a pattern structure corresponding to the predetermined structure.

2. The method according to claim 1, wherein the transparent injection-molded body is used in a thermal reflow process with an operation temperature above 220 □.

3. The method according to claim 2, wherein the operation temperature of the thermal reflow is ranged from 240° C. to 260° C. .

4. The method according to claim 1, wherein the transparent material is a thermoplastic material and comprises polyamide or polyphthalamide.

5. The method according to claim 1, wherein the transparent material is a thermosetting material and comprises silicone or resin materials.

6. The method according to claim 2, wherein the transparent material further has an additive and the additive is a diffusing agent or fluorescent powders.

7. The method according to claim 4, wherein the transparent material further has an additive, the additive is a diffusing agent or fluorescent powders.

8. The method according to claim 5, wherein the transparent material further has an additive, the additive is a diffusing agent or fluorescent powders.

9. The method according to claim 1, wherein the predetermined structure is an arc structure, a groove structure, a V-cutting structure, or a salient structure with equivalent convex lens, so that the pattern structure on the inner surface of the formed transparent injection-molded body is a lens structure, a trench structure, a notch structure, or an equivalent concave lens.

10. The method according to claim 1, wherein the lower mold has a microstructure formed thereon, and the transparent injection-molded body has an optical microstructure corresponding to the microstructure in a lighting surface thereof.

11. The method according to claim 1, further comprising a printing step to print at least one color on the reflecting cover.

12. The method according to claim 11, wherein the printing step is performed between the first injection-molding step and the second injection-molding step.

13. The method according to claim 11, wherein the printing step is performed after the second injection-molding step.

14. The method according to claim 1, wherein at least one of the reflecting surfaces has a first rough structure and the surface of the transparent injection-molded body corresponding to the at least one of the reflecting surfaces has a second rough structure corresponding to the first rough structure.

15. A method for manufacturing a housing of a numeric display, comprising the steps of:
    forming a reflecting cover by injection-molding, wherein the reflecting cover has a plurality of pattern segment units, and each pattern segment unit is defined by a plurality of reflecting surfaces of the reflecting cover and has a through hole; and
    filling a transparent material into each pattern segment unit to form a transparent injection-molded body by injection-molding, wherein surfaces of the formed transparent injection-molded body being bonded to the corresponding reflecting surfaces, whereby the reflecting cover and the transparent injection-molded body are constructed as the housing of the numeric display, wherein an upper mold and a lower mold are used to clamp the reflecting cover, the upper mold has a protrusion member and a gate, the protrusion member extends into one of the pattern segment units the protrusion member further has a predetermined structure, and the transparent material is filled into a space defined by the lower mold, the protrusion member, and the reflecting surfaces through the gate to form the transparent injection-molded body, wherein an inner surface of the formed transparent injection-molded body has a pattern structure corresponding to the predetermined structure.

* * * * *